Nov. 10, 1931.  E. B. HEALEY  1,830,900
AUTOMOBILE RUNNING BOARD LIGHT
Filed May 21, 1930
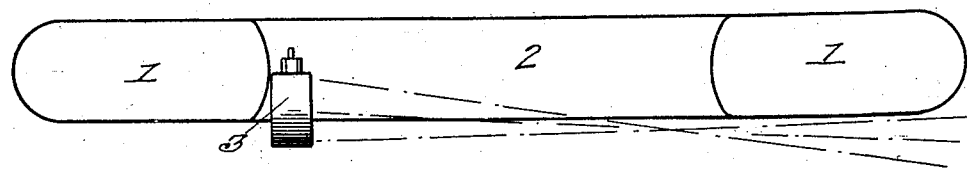
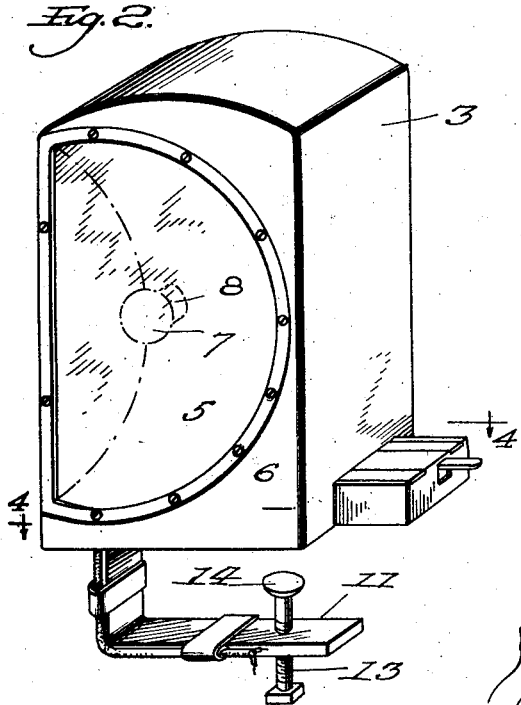
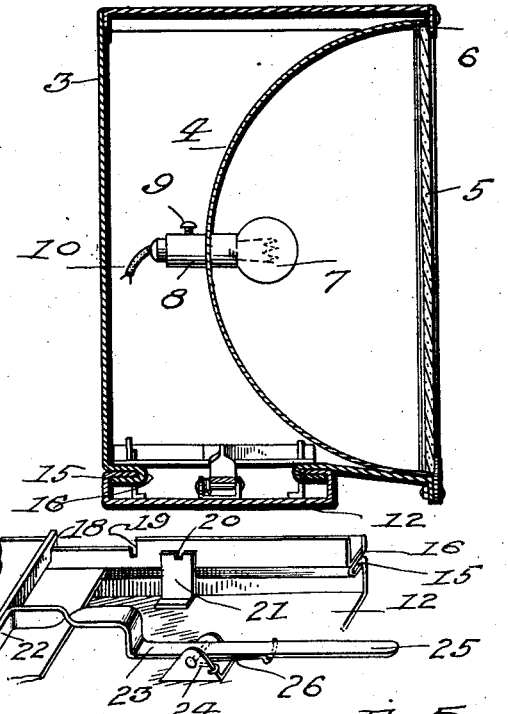
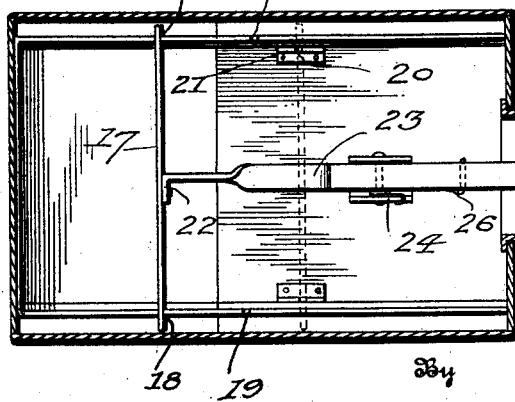
Inventor
EARL B. HEALEY
By
Attorney Patented Nov. 10, 1931

1,830,900

UNITED STATES PATENT OFFICE

EARL B. HEALEY, OF TAMPA, FLORIDA

AUTOMOBILE RUNNING BOARD LIGHT

Application filed May 21, 1930. Serial No. 454,409.

My invention relates to improvements in automobile running board lights, and one object of my invention is the provision of a light which can be easily attached to or removed from the running board in the proper position to throw a beam of light forward and to the side to illuminate the road at the right of the machine to guard against the automobile leaving the road, and thus insure an efficient and practical means for preventing the constantly occuring accidents.

Another object of my invention is the provision of a portable light of a size to occupy a small space on the running board and which will be of ornamental appearance and which may be moved in and out with reference to the running board to direct the light in the most desired position with reference to the machine and road conditions.

Another object of my invention is the provision of a running board light which can be made at a low price; which may be used on the running board as a fixture or quickly removed to be employed for other illuminating purposes and which generally in every respect will prove efficient and practical.

To attain the objects stated and such others as pertain to an invention of this character, my invention consists of a running board light embodying novel features of construction and combination of parts, substantially as described and claimed and as shown in the accompanying drawings, in which:

Figure 1 represents a plan view of the running board and fenders of an automobile with my light applied to show its application and relation to the running board.

Figure 2 represents a perspective view of the light shown detached from the running board and on an enlarged scale.

Figure 3 represents a vertical central sectional view of the light.

Figure 4 represents a sectional view on the line 4—4 of Figure 2, and

Figure 5 represents a detail perspective view of the novel means embodied in my light for moving the light laterally with reference to the running board and retaining it in adjusted positions.

In order that the application of my light to the running board may be understood and its many advantages be appreciated I have shown sufficient of an automobile to illustrate the manner of using my light in connection with the fenders 1 and the running board 2, the light proper consisting of an outer casing 3, of rectangular outline, having disposed in proper relation the reflector 4, the glass panel 5, the retaining band 6, and the lamp 7, fitted in the collar 8, and retained in place by the set screw 9, and from the lamp leads the light supplying wires 10.

From this construction it will be apparent that I provide a light which is properly disposed in relation to the machine and running board to throw the beam or rays of light forward and to the right side to brightly illuminate the road.

In order that the light may be rigidly attached to the running board and may also be moved out and in with reference to said running board to cast the rays of light in the desired direction, I provide a novel structure, which is most clearly seen in Figures 4 and 5, and the structure as a whole is secured to the running board by the angle bracket 11, secured to the flat bottom 12, of the casing, and in this bracket is mounted the adjusting screw 13, carrying the head 14, adapted to engage the underface of the running board and with the flat bottom 12 serves to hold the light stationary. The casing bottom 12, is formed with cleats 15, which engage cleats 16, on the upper part of the casing and this permits the casing to be moved in and out, to cause the locking bar 17, to engage the kerfs 18 or 19, or to engage the kerfs 20 on the stop plate 21, to provide a series of adjustments of the lamp upon the running board, said locking bar 17 being carried on the outer end 22, of the lever 23, pivoted in the support 24, and having its inner end 25, forming a finger pressing portion to release the locking bar, a spring 26, being provided to cause said locking bar to retain its proper position and prevent accidental displacement.

From the description and drawings it will be noted that the light is easily applied or removed from the running board, and that the construction of the locking bar and the series of kerfs allow the lamp to have various adjustments to suit conditions and that generally the invention is efficient and practical.

I claim:

1. A running board light for automobiles, comprising a base adapted to rest upon the upper side of the running board, an angular clamping member secured to said base and adapted to clamp against the underface of the running board, an upper portion adapted to fit and be movable upon said base, a reflector mounted in said upper portion, and manually operated means disposed between the base and upper portion of the light for securing said upper portion with reflector in proper adjusted position, said manually operated means consisting of a lever pivoted in the lower section of the light, a transverse locking bar at one end of said lever, and keepers carried by the upper section and adapted to be engaged by said locking bar to retain the movable section in proper adjustment.

2. A running board light for automobiles, comprising a base portion adapted to be fitted and rigidly secured on the upper face of a running board, guides formed on said base portion, an upper portion having guides fitting the guides of said base portion to allow said upper portion to move upon said base portion, manually operated means between the base portion and upper portion for adjusting said upper portion on said base portion, and a reflector carried by said upper adjustable portion, said manually operated means consisting of a lever pivoted in the lower section of the light, a transverse locking bar at one end of said lever, and keepers carried by the upper section and adapted to be engaged by said locking bar to retain the movable section in proper adjustment.

3. A running board light for automobiles, comprising a base portion adapted to be clamped on the upper face of the running board, guides formed on said base portion, an upper casing portion having guides to fit the guides of the base portion whereby the upper portion is adjustable on said base portion, a reflector within the upper casing portion, a hand controlled lever pivoted on the base portion, a locking bar at the inner end of said hand controlled lever, kerfs formed in the upper portion to be engaged by said locking bar to retain said upper portion in desired adjustment, and a spring to engage said lever to retain it in proper position.

In testimony whereof I affix my signature.

EARL B. HEALEY.